US009171377B2

(12) United States Patent
Kabus et al.

(10) Patent No.: US 9,171,377 B2
(45) Date of Patent: Oct. 27, 2015

(54) AUTOMATIC POINT-WISE VALIDATION OF RESPIRATORY MOTION ESTIMATION

(75) Inventors: Sven Kabus, Hamburg (DE); Tobias Klinder, Uelzen (DE); Cristian Lorenz, Hamburg (DE)

(73) Assignee: Koninklijke Philips N.V., Eindhoven (NL)

( * ) Notice: Subject to any disclaimer, the term of this patent is extended or adjusted under 35 U.S.C. 154(b) by 91 days.

(21) Appl. No.: 13/808,607

(22) PCT Filed: Jul. 5, 2011

(86) PCT No.: PCT/IB2011/052971

§ 371 (c)(1),
(2), (4) Date: Jan. 7, 2013

(87) PCT Pub. No.: WO2012/004742

PCT Pub. Date: Jan. 12, 2012

(65) Prior Publication Data

US 2013/0108117 A1    May 2, 2013

(30) Foreign Application Priority Data

Jul. 9, 2010  (EP) .................................... 10169051

(51) Int. Cl.
*G06K 9/00*  (2006.01)
*G06T 7/20*  (2006.01)
(Continued)

(52) U.S. Cl.
CPC ................. *G06T 7/20* (2013.01); *G06T 3/0081* (2013.01); *G06T 7/0016* (2013.01); *G06T 7/0024* (2013.01); *G06T 2207/10081* (2013.01); *G06T 2207/30061* (2013.01)

(58) Field of Classification Search
None
See application file for complete search history.

(56) References Cited

U.S. PATENT DOCUMENTS 7,295,951 B2 * 11/2007 Valadez .................. 702/182
2003/0220772 A1 * 11/2003 Chiang et al. .............. 703/2

(Continued)

FOREIGN PATENT DOCUMENTS

WO    2004051571 A2    6/2004

OTHER PUBLICATIONS

Noblet et al, "A Topology Preserving Non-Rigid Registration Method Using a Symmetric Similarity Function-Application to 3-D Brain Images", Computer Vision—ECCV, Apr. 22, 2004, pp. 546-557.
Acar et al, "Edge Displacement Field-Based Classification for Improved Detection of Polyps in CT Colonography", IEEE Transactions on Medical Imaging, vol. 21, No. 12, Dec. 2002, pp. 1461-1467.
Lin et al, "A Topology Preserving Non-Rigid Registration Algorithm With Integration Shape Knowledge to Segment Brain Subcortical Structures From MRI Images", Pattern Recognition, vol. 43, 2010, pp. 2418-2427.

(Continued)

*Primary Examiner* — Tahmina Ansari (57) ABSTRACT

A system for validating motion estimation comprising a field unit (110) for obtaining a deformation vector field (DVF) estimating the motion by transforming a first image at a first phase of the motion into a second image at a second phase of the motion, a metric unit (120) for computing a metric of a local volume change at a plurality of locations, and a conformity unit (130) for computing a conformity measure based on the computed metric of the local volume change at the plurality of locations and a local property of the first or second image defined at the plurality of locations. Based on the value of the conformity measure, the DFV estimating the motion is validated. Experiments show that the conformity measure based on the computed metric of a local volume change at a plurality of locations and the local property of the first or second image, defined at the plurality of locations, does not necessarily favor a large weight for the outer force to provide a more accurate registration. One reason for this observation may be that large deformations providing more accurate alignment often lead to deformations resulting in unreasonably large volume changes. DVFs comprising such deformations thus are more likely to be discarded by the system of the invention.

12 Claims, 6 Drawing Sheets

(51) Int. Cl.
*G06T 3/00* (2006.01)
*G06T 7/00* (2006.01)

(56) References Cited

U.S. PATENT DOCUMENTS

| | | | |
|---|---|---|---|
| 2004/0064036 A1* | 4/2004 | Mao et al. | 600/413 |
| 2006/0224363 A1* | 10/2006 | Valadez | 702/189 |
| 2008/0159630 A1* | 7/2008 | Sharon et al. | 382/199 |
| 2009/0275831 A1* | 11/2009 | Hall et al. | 600/437 |
| 2013/0108117 A1* | 5/2013 | Kabus et al. | 382/107 |

OTHER PUBLICATIONS

Christensen et al, "Introduction to the Non-Rigid Image Registration Evaluation Project (NIREP)", Biomedical Image Registration Lecture Notes in Computer Science, Jan. 1, 2006, pp. 128-135.

McLeish et al, "A Study of the Motion and Deformation of the Heart Due to Respiration", IEEE Transactions on Medical Imaging, vol. 21, No. 9, Sep. 2002, pp. 1142-1150.

Woods et al,L "Automated Image Registration: I. General Methods and Intrasubject, Intramodality Validation", Journal of Computer Assisted Tomogrophy, 22(I), 1998, pp. 139-152.

* cited by examiner

AUTOMATIC POINT-WISE VALIDATION OF RESPIRATORY MOTION ESTIMATION

FIELD OF THE INVENTION

In general, this invention relates to automatic point-wise validation of motion estimation, wherein the motion is estimated by a deformation vector field for transforming a first image at a first phase of the motion into a second image at a second phase of the motion. In particular, this invention relates to automatic point-wise validation of respiratory motion estimation on the basis of CT images.

BACKGROUND OF THE INVENTION

Compensating body motion in medical imaging is a necessity and has already become indispensable in this area. Since motion compensation by rigid or affine transformations is suitable only for few clinical target applications (e.g. patient positioning for brain applications), motion compensation by a non-rigid or elastic transformation has become state-of-the-art. A prominent example for the usefulness of an elastic transformation is respiratory motion.

Motion compensation requires the registration of at least two images for computing a deformation vector field (DVF) that aligns one image according to a second image. As a necessary criterion for a successful registration, the smallness of the residuum image (i.e., of the subtraction of the aligned first image and second image) can be used. Misaligned image structures are visible as remaining shadows in the residuum. However, the absence of any structure in the residuum image does not guarantee a successful registration since the residuum is invariant to the deformation of homogeneous image regions.

Typically, an image registration scheme aims at balancing two types of forces: an outer force driven by the difference of the two images and an inner force driven by a physical model. Consequently, a weighting factor is introduced to balance these two forces. Generally, the application of a large weight on the outer force is likely to yield a small residuum image. Unfortunately, it often introduces incorrect deformations, even folding, into the DVF. Therefore, using a residuum image for validating a DVF may often lead to an erroneous determination of the DVF.

SUMMARY OF THE INVENTION

It would be useful to provide a validation scheme for reducing the likelihood of positive validation of an erroneously estimated DVF.

Thus, in the first aspect the invention provides a system for validating motion estimation, comprising:

a field unit for obtaining a deformation vector field estimating the motion by transforming a first image at a first phase of the motion into a second image at a second phase of the motion;

a metric unit for computing a metric of a local volume change at a plurality of locations; and a conformity unit for computing a conformity measure based on the computed metric of the local volume change at the plurality of locations and a local property of the first or second image, defined at the plurality of locations.

Based on the value of the conformity measure, the DFV estimating the motion is validated. Experiments show that the conformity measure based on the computed metric of a local volume change at a plurality of locations and the local property of the first or second image, defined at the plurality of locations, does not necessarily favor a large weight for the outer force to provide a more accurate registration. One reason for this observation may be that large deformations providing more accurate alignment often lead to deformations resulting in unreasonably large volume changes. DVFs comprising such deformations thus are more likely to be discarded by the system of the invention.

In an embodiment of the system, the metric of the local volume change is based on the Jacobian metric.

In an embodiment of the system, the metric unit is further arranged for computing an image-intensity-based metric of the local volume change at the plurality of locations, based on the first and second image, and the local property of the first or second image defined at the plurality of locations is the computed image-intensity-based metric. In CT images, the intensity is measured in Hounsfield units (HUs). The conformity unit is arranged for computing the conformity measure based on two metrics of a local volume change: the image-intensity-based metric and, for example, the Jacobian metric.

In an embodiment of the system, the conformity measure is computed at the plurality of locations, based on the computed metric of the local volume change at the plurality of locations and the local property of the first or second image defined at the plurality of locations, thereby becoming a conformity map. For example, the metric of the local volume change may be the Jacobian metric, the local property may be the image-intensity-based metric, and, at each location of the plurality of locations, the conformity measure may be the absolute value of the difference of the Jacobian metric and the intensity metric at said location. The conformity map allows validating the motion estimation locally, at the plurality of locations.

In an embodiment of the system, the local property is the intensity of the first image, the conformity unit is arranged for determining a neighborhood at each one of the plurality of locations, and the conformity measure is computed at each one of the plurality of locations, based on the correlation coefficient computed by fitting a hyperbolic function to a joint distribution of corresponding values of the metric of a local volume change and the first image intensity at each position in the determined neighborhood. The working of this embodiment can be explained by the fact that the low/high image intensity, measured e.g. in HU units in CT images, corresponds to, respectively, low/high tissue density. A low tissue density in turn results in high tissue compressibility while a high tissue density results in low tissue compressibility.

In an embodiment, the system further comprises a peak unit for detecting peaks in the conformity map. Locations of the detected peaks in the conformity map may be communicated to the user to indicate locations of possible faults in the DVF, i.e. of mis-registration of the first and second image. The detected peaks in the conformity map may be overlaid onto the first or second image and displayed with the first or second image.

In an embodiment of the system, the field unit is arranged for computing the deformation vector field, using elastic registration of the first image with the second image.

In an embodiment, the system further comprises an update unit for updating the deformation vector field, based on the computed conformity measure. The conformity measure may be used as a sole input for updating the deformation vector field or in addition to other inputs for updating the deformation vector field. For example, the weights of the inner and outer forces driving the elastic image registration may be location-dependent, taking into account locations of the detected peaks in the conformity maps.

In an embodiment, the system is used for validating respiratory motion estimation. Other possible uses include, but are not limited to, heart contraction and expansion and tumor growth or remission.

In the second aspect of the invention, a workstation comprising the system according to the invention is provided.

In the third aspect of the invention, an image acquisition apparatus comprising the system according to the invention is provided.

In the fourth aspect of the invention, a method of validating motion estimation is provided, the method comprising:

a field step for obtaining a deformation vector field estimating the motion by transforming a first image at a first phase of the motion into a second image at a second phase of the motion;

a metric step for computing a metric of a local volume change at a plurality of locations; and a conformity step for computing a conformity measure, based on the computed metric of the local volume change at the plurality of locations and a local property of the first or second image defined at the plurality of locations.

In the fifth aspect of the invention, a computer program product, which program is operative to cause a processor to perform a method according to the invention, is provided.

The invention is defined by the independent claims which will be elucidated with reference to the embodiments defined in the dependent claims.

It will be appreciated by those skilled in the art that two or more of the above-mentioned embodiments, implementations, and/or aspects of the invention may be combined in any way deemed useful.

Modifications and variations of the system, of the method, of the image acquisition apparatus, of the workstation, and/or of the computer program product, which correspond to the described modifications and variations of the system or the method, can be carried out by a person skilled in the art on the basis of the present description.

A person skilled in the art will appreciate that an image dataset in the claimed invention may be a 2-dimensional (2-D), 3-dimensional (3-D) or 4-dimensional (4-D) image dataset, acquired by various acquisition modalities such as, but not limited to, X-ray Imaging, Computed Tomography (CT), Magnetic Resonance Imaging (MRI), Ultrasound (US), Positron Emission Tomography (PET), Single Photon Emission Computed Tomography (SPECT), and Nuclear Medicine (NM).

BRIEF DESCRIPTION OF THE DRAWINGS

These and other aspects of the invention will be further elucidated and described with reference to the drawing, in which.

Identical reference numerals are used to denote similar parts throughout the Figures.

DETAILED DESCRIPTION OF THE INVENTION

Figure 1:
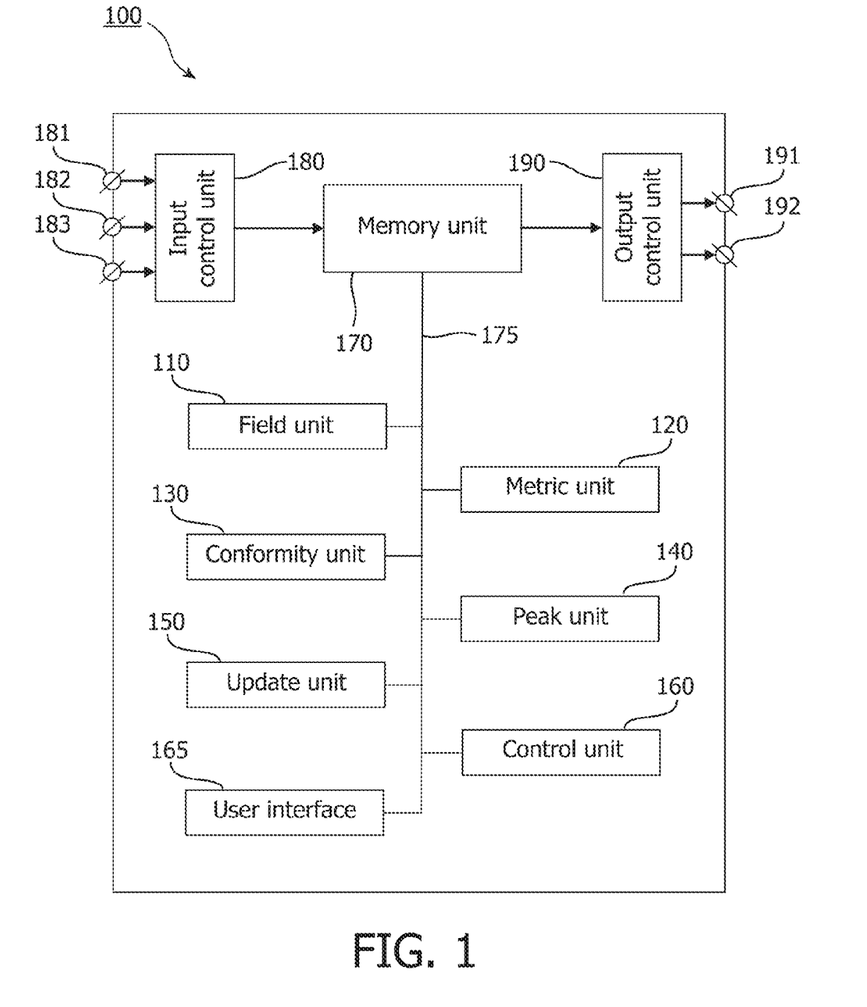
FIG. 1 shows a block diagram of an exemplary embodiment of the system.

FIG. 1 schematically shows a block diagram of an exemplary embodiment of the system 100 for validating motion estimation, comprising:

a field unit 110 for obtaining a deformation vector field estimating the motion by transforming a first image at a first phase of the motion into a second image at a second phase of the motion;

a metric unit 120 for computing a metric of a local volume change at a plurality of locations; and a conformity unit 130 for computing a conformity measure, based on the computed metric of the local volume change at the plurality of locations and a local property of the first or second image defined at the plurality of locations.

The exemplary embodiment of the system 100 further comprises:

a peak unit 140 for detecting peaks in the conformity map;

an update unit 150 for updating the deformation vector field, based on the computed conformity measure.

a control unit 160 for controlling the work of the system 100;

a user interface 165 for communication between the user and the system 100; and a memory unit 170 for storing data.

In an embodiment of the system 100, there are three input connectors 181, 182 and 183 for the incoming data. The first input connector 181 is arranged to receive data coming in from a data storage means such as, but not limited to, a hard disk, a magnetic tape, a flash memory, or an optical disk. The second input connector 182 is arranged to receive data coming in from a user input device such as, but not limited to, a mouse or a touch screen. The third input connector 183 is arranged to receive data coming in from a user input device such as a keyboard. The input connectors 181, 182 and 183 are connected to an input control unit 180.

In an embodiment of the system 100, there are two output connectors 191 and 192 for the outgoing data. The first output connector 191 is arranged to output the data to a data storage means such as a hard disk, a magnetic tape, a flash memory, or an optical disk. The second output connector 192 is arranged to output the data to a display device. The output connectors 191 and 192 receive the respective data via an output control unit 190.

A person skilled in the art will understand that there are many ways to connect input devices to the input connectors 181, 182 and 183 and output devices to the output connectors 191 and 192 of the system 100. These ways comprise, but are not limited to, a wired and a wireless connection, a digital network such as, but not limited to, a Local Area Network (LAN) and a Wide Area Network (WAN), the Internet, a digital telephone network, and an analog telephone network.

In an embodiment of the system 100, the system 100 comprises a memory unit 170. The system 100 is arranged to receive input data from external devices via any of the input connectors 181, 182, and 183 and to store the received input data in the memory unit 170. Loading the input data into the memory unit 170 allows quick access to relevant data portions by the units of the system 100. The input data comprises, for example, the first and second image. The memory unit 170 may be implemented by devices such as, but not limited to, a register file of a CPU, a cache memory, a Random Access Memory (RAM) chip, a Read Only Memory (ROM) chip, and/or a hard disk drive and a hard disk. The memory unit 170 may be further arranged to store the output data. The output data comprises, for example, the conformity map, optionally overlayed on the first image. The memory unit 170 may be also arranged to receive data from and/or deliver data to the units of the system 100 comprising the field unit 110, the metric unit 120, the conformity unit 130, the peak unit 140, the update unit 150, the control unit 160, and the user interface 165, via a memory bus 175. The memory unit 170 is further arranged to make the output data available to external devices via any of the output connectors 191 and 192. Storing data from the units of the system 100 in the memory unit 170 may advantageously improve performance of the units of the system 100 as well as the rate of transfer of the output data from the units of the system 100 to external devices.

In an embodiment of the system 100, the system 100 comprises a control unit 160 for controlling the system 100. The control unit 160 may be arranged to receive control data from and provide control data to the units of the system 100. For example, after computing the metric of a local volume change at a plurality of locations, the metric unit 120 may be arranged to provide control data "the local volume change is computed" to the control unit 160, and the control unit 160 may be arranged to provide control data "compute conformity map" to the conformity unit 130. Alternatively, a control function may be implemented in another unit of the system 100.

In an embodiment of the system 100, the system 100 comprises a user interface 165 for communication between a user and the system 100. The user interface 165 may be arranged to receive a user input for selecting the local property of the first or second image for use by the conformity unit 130 for computing the conformity measure at the plurality of locations. Next, the user interface may be adapted for displaying the conformity map, optionally overlaid on the first or second image. A person skilled in the art will understand that more functions may be advantageously implemented in the user interface 165 of the system 100.

The system of the invention will now be described with reference to validation of CT lung registration, based on the lung deformation vector field. The skilled person will understand that the invention may be useful also for validating other motions and/or that the acquisition methods are not limited to CT. The following embodiments illustrate the invention and should not be construed as limiting the scope of the claims.

In an embodiment, the field unit 110 of the system 100 of the invention is arranged for computing the deformation vector field estimating the respiratory motion of lungs based on two CT scans, a first and second image, acquired at two phases of the respiratory motion. The DVF is computed using an elastic registration of the two CT scans. Said elastic registration transforms the first image onto the second image. Suitable elastic image registration schemes are described, for example in Modersitzki, J.: Numerical Methods for Image Registration. Oxford University Press, 2004.

Next, the metric unit 120 is arranged for computing a metric of a local volume change at a plurality of locations, using the Jacobian metric, in the following manner. The local volume change in the lung is also known as the local lung ventilation. Let u denote the DVF mapping the first image onto the second image. For each voxel position x, the local volume change $M_1(x)$ is given by $$M_1(x) = \det(J(x+u(x))) - 1$$

where J denotes the Jacobian matrix and det denotes the determinant.

Concurrently with, prior to, or subsequently to the Jacobian metric computation, the conformity unit 130 is arranged for computing a local property of the first or second image. This local property is an image-intensity-based metric, and more specifically, the so-called HU metric of a local volume change which is computed according to Guerrero, T., Sanders, K., Castillo, E., Zhang, Y., Bidaut, L., Pan, T., Komaki, R.: Dynamic ventilation imaging from four-dimensional computed tomography. Phys Med Biol 51(4) (2006) 777-91, in the following manner. Again, let u denote the DVF mapping the first image onto the second image and let $I_1(x)$, $I_2(x)$ denote the intensity values in Hounsfield units of, respectively, the first and second image at a voxel position x. The HU metric $M_2(x)$ is defined as $$M_2(x) = 1000 * (I_2(x+u(x)) - I_1(x))/(I_1(x) * I_2(x+u(x))) + 1000).$$

$M_2(x)$ can be interpreted as the relative change in density of corresponding anatomical positions in the two images. Its numerator is identical to the residuum image.

Depending on the chosen scanner protocol or other circumstances, the calibrating values for water and air may differ. For example, instead of the typical value of −1000 HU, the calibrating value of −1024 HU may be used for air. When the calibrating values are changed, the formula for $M_2(x)$ must be updated accordingly.

After computing $M_1(x)$ and $M_2(x)$, the conformity unit 130 is arranged for computing the value of the conformity map $C(x) = f(M_1(x), M_2(x))$ at each position x in the first image space, wherein f is a suitable function of two real variables. In an embodiment the conformity map is the absolute difference of $M_1(x)$ and $M_2(x)$: $C(x) = |M_1(x) - M_2(x)|$.

After computing the conformity map, the peak unit 140 is arranged for detecting local peaks $x_P$ in the conformity map C. Optionally, the detected peak positions $x_P$ or $x_P + u(x_P)$ are overlaid onto, respectively, the first image or the second image, and displayed to the physician.

Figure 2A:
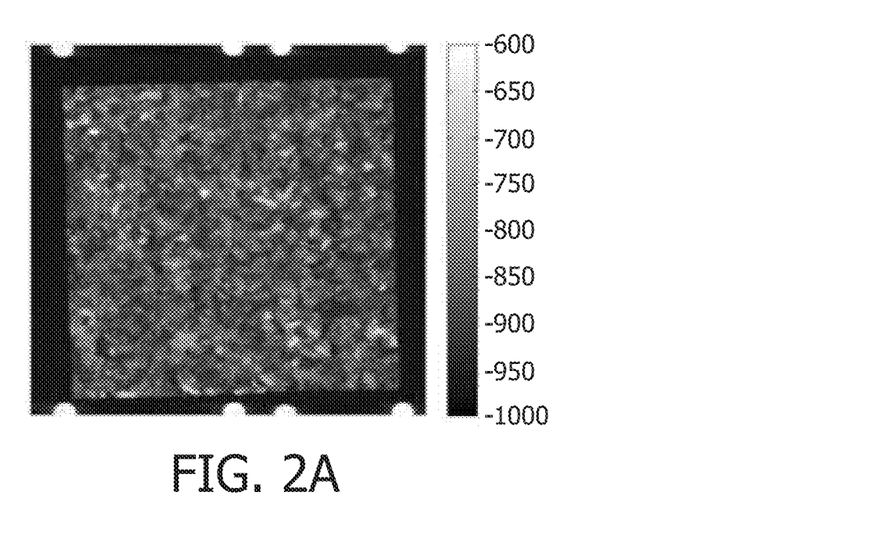
FIG. 2A shows an exemplary slice of a CT lung parenchyma phantom.
Figure 2B:
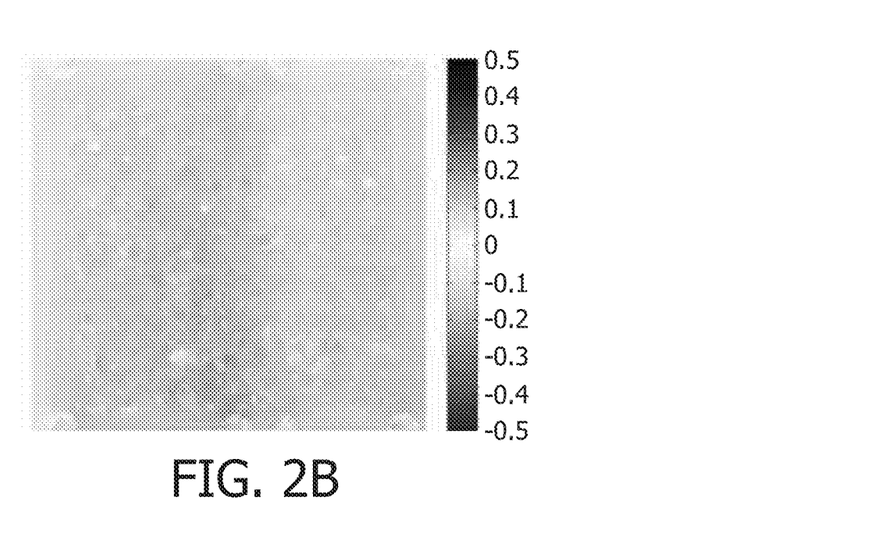
FIG. 2B shows the Jacobian metric after a compression of the lung parenchyma phantom.
Figure 2C:
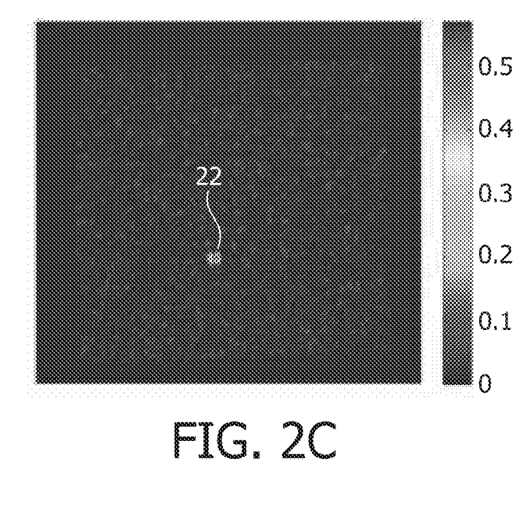
FIG. 2C shows an exemplary conformity map.
Figure 2D:
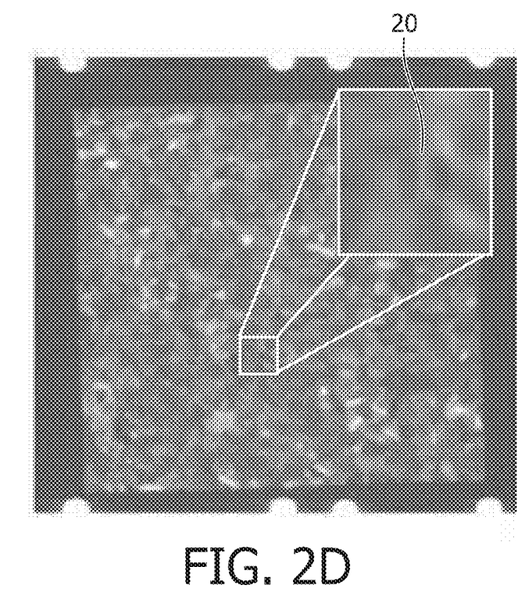
FIG. 2D shows the conformity map overlaid onto the CT slice.

FIG. 2A shows an exemplary first image showing a slice of a CT lung parenchyma phantom. The lung parenchyma phantom was compressed by 5 to 23%. FIG. 2B shows the Jacobian metric after the compression of the lung parenchyma phantom. In FIG. 2B, bright areas indicate volume preservation while dark areas indicate local contraction or expansion. Local contraction and expansion can be differentiated using a color coding. FIG. 2C shows a conformity map computed on the basis of the first image showing the lung parynchema phantom (FIG. 2A) and the second image comprising the compressed lung parenchyma phantom (not shown). The conformity map shows a "hot spot" 20, i.e. a local disturbance of the DVF. In FIG. 2D, the conformity map including the hot spot 20 is overlaid onto the first image.

In an embodiment of the system, the conformity map is computed based on the jacobian metric $M_1(x)$ of a local volume change and the intensities of the first image $I_1(x)$. To this end, for each voxel x a neighborhood $N(x)$ is chosen. For each voxel $y \in N(x)$, the values $M_1(y)$ and $I_1(y)$ are obtained. The joint distribution of $M_1(y)$ and $I_1(y)$, represented graphically by a scatter plot of $(I_1(y), M_1(y))$, is modeled by a hyperbolic function $M_1(y) = 1/(a + b * I_1(y))$, wherein a and b are parameters of the hyperbolic function. The correlation coefficient (i.e. the so-called $r^2$ value) is the value of the conformity map at x.

The reason why the joint distribution of $M_1(y)$ and $I_1(y)$, represented graphically by a scatter plot of $(I_1(y), M_1(y))$, can be modeled by a hyperbolic function $M_1(y) = a/(1 + b * I_1(y))$ is that the values of $M_1(y)$ and $I_1(y)$ appear inversely proportional: a low tissue density resulting from a lung region, comprising mainly alveoli, undergoes higher volume changes, i.e. shows higher deformability, especially compressibility, while a high tissue density resulting from a lung region, comprising principal parts of the bronchial tree and/or structures made of cartilage, undergoes limited volume changes, i.e. shows limited deformability, especially compressibility.

Figure 3:
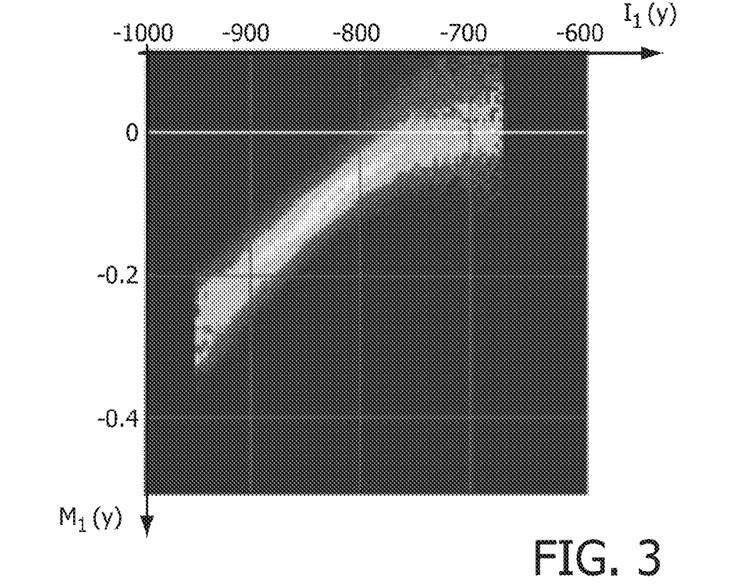
FIG. 3 shows an exemplary scatter plot of the local volume change and the corresponding image intensity, computed in a neighborhood of a voxel shown in FIG. 2A.

FIG. 3 shows an exemplary scatter plot of $(I_1(y), M_1(y))$ computed in a neighborhood $N(x)$ of a voxel x, based on the exemplary first image showing the slice of a CT lung parenchyma phantom (FIG. 2A) and a second image of the lung parenchyma phantom compressed by 5 to 23%. It can be seen that voxels with a low Hounsfield value are more deformable than voxels with a higher Hounsfield value. Note that a volume change of 0 corresponds to volume preservation and a volume change of −0.5, for example, corresponds to a volume contraction by a factor of 2.

In an embodiment, the system 100 further comprises an update unit 150 for updating the deformation vector field, based on the computed conformity measure. If the conformity measure does not satisfy a condition, for example if the difference $C(x)=|M_1(x)-M_2(x)|$ is greater than a threshold at some voxels x, the update unit 150 is arranged to detect this fact and to modify the DVF in order to minimize an objective function. The objective function may be, for example, a weighted sum of the maximum of a conformity measure $C(x)$ and the maximum of the residuum image $R(x)=I_2(x+u(x))-I_1(x)$. The skilled person will know many suitable minimization techniques which include, but are not limited to, gradient descent, conjugate gradient method, simplex method and simulated annealing.

A person skilled in the art will appreciate that the system 100 may be a valuable tool for assisting a physician in many aspects of her/his job. Further, although the embodiments of the system are illustrated using medical applications of the system, non-medical applications of the system are also contemplated.

Those skilled in the art will further understand that other embodiments of the system 100 are also possible. It is possible, among other things, to redefine the units of the system and to redistribute their functions. Although the described embodiments apply to medical images, other applications of the system, not related to medical applications, are also possible.

The units of the system 100 may be implemented using a processor. Normally, their functions are performed under the control of a software program product. During execution, the software program product is normally loaded into a memory, like a RAM, and executed therefrom. The program may be loaded from a background memory, such as a ROM, hard disk, or magnetic and/or optical storage, or may be loaded via a network like the Internet. Optionally, an application-specific integrated circuit may provide the described functionality.

Figure 4:
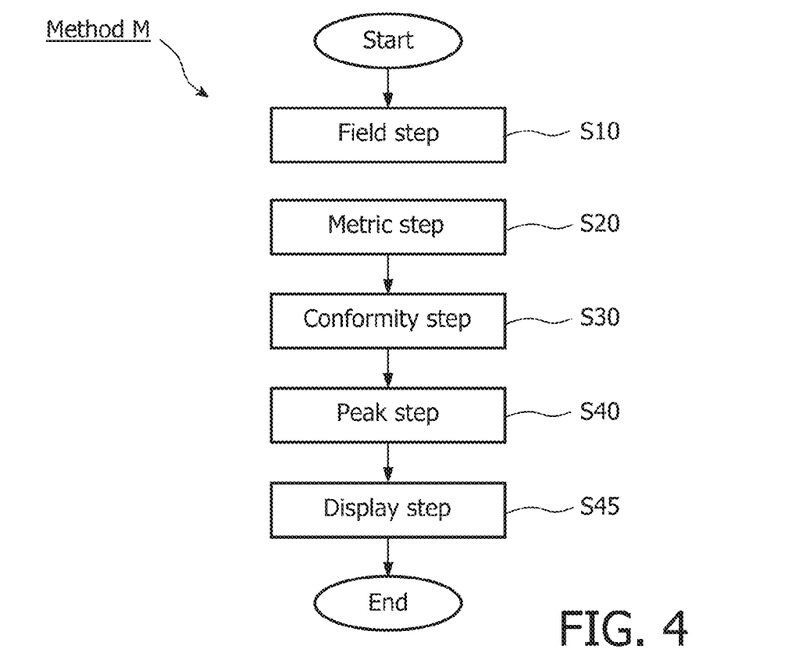
FIG. 4 shows a flow diagram of a method according to the invention.

An exemplary flowchart of the method M of validating motion estimation is schematically shown in FIG. 4. The method M begins with a field step S10 for obtaining a deformation vector field estimating the motion by transforming a first image at a first phase of the motion into a second image at a second phase of the motion. After the field step S10, the method M continues to a metric step S20 for computing a metric of a local volume change at a plurality of locations. After the metric step S20, the method M continues to a conformity step S30 for computing a conformity measure, based on the computed metric of the local volume change at the plurality of locations and a local property of the first or second image defined at the plurality of locations. Optionally, after the conformity step S30, the method M continues to a peak step S40 for detecting peaks in the conformity map. The detected peaks are displayed in a display step S45. After the conformity step S30 or, optionally, after the conformity step S40 and the display step S45, the method M terminates.

A person skilled in the art may change the order of some steps or perform some steps concurrently using threading models, multi-processor systems or multiple processes without departing from the concept as intended by the present invention. Optionally, two or more steps of the method M may be combined into one step.

Figure 5:
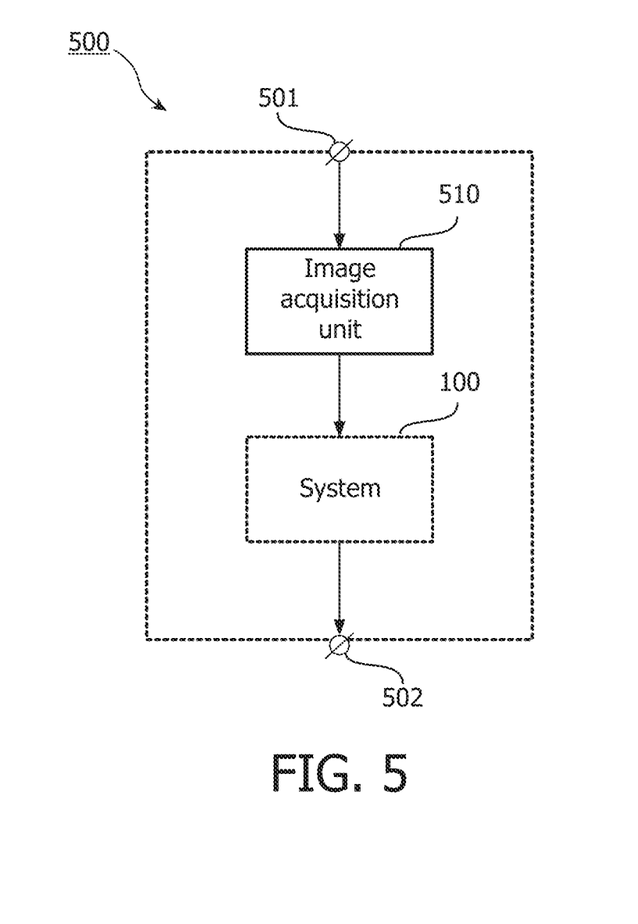
FIG. 5 schematically shows an exemplary embodiment of the image acquisition apparatus.

FIG. 5 schematically shows an exemplary embodiment of the image acquisition apparatus 500 employing the system 100 of the invention, said image acquisition apparatus 500 comprising an image acquisition unit 510 connected via an internal connection with the system 100, an input connector 501, and an output connector 502. This arrangement advantageously increases the capabilities of the image acquisition apparatus 500, providing said image acquisition apparatus 500 with advantageous capabilities of the system 100.

Figure 6:
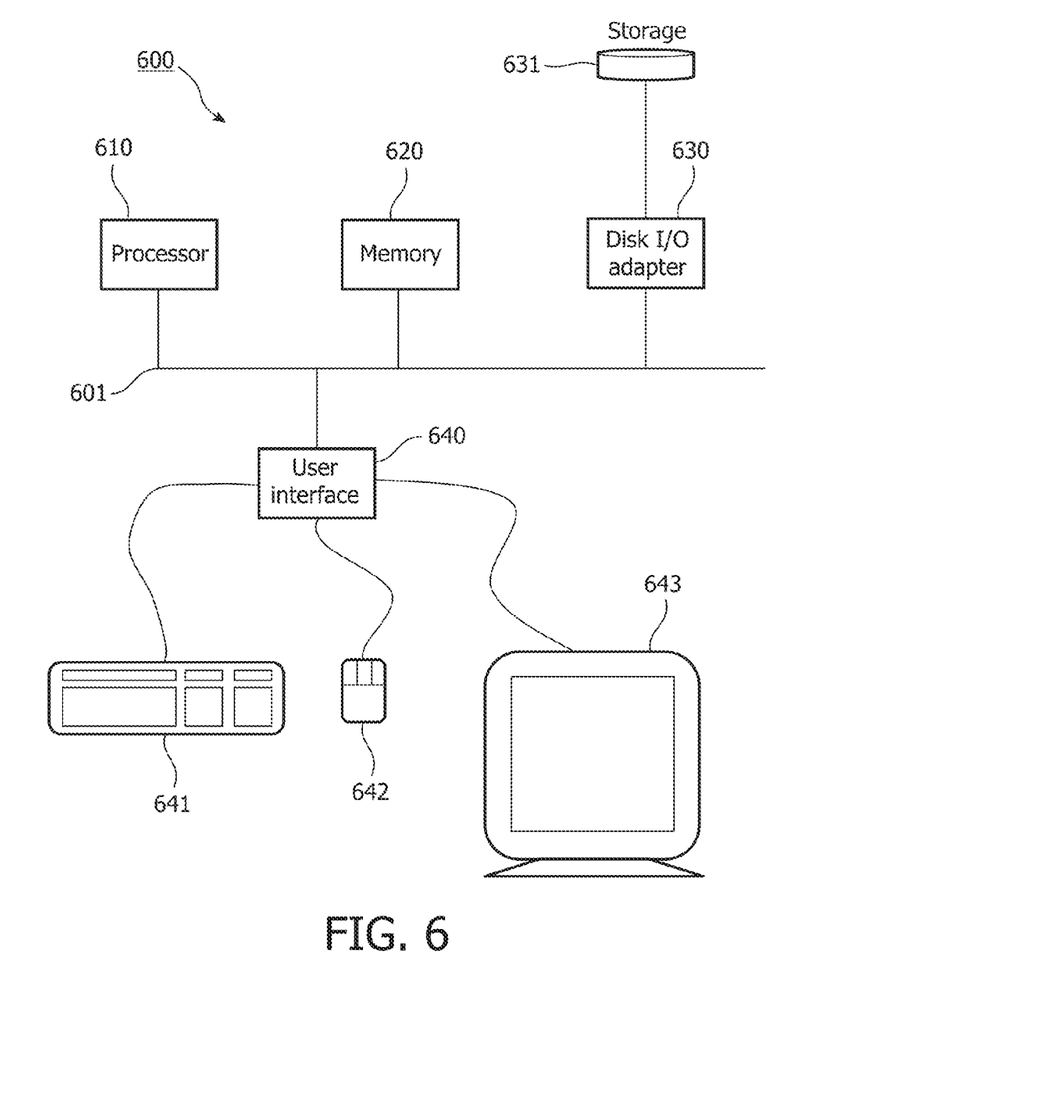
FIG. 6 schematically shows an exemplary embodiment of the workstation.

FIG. 6 schematically shows an exemplary embodiment of the workstation 600. The workstation comprises a system bus 601. A processor 610, a memory 620, a disk input/output (I/O) adapter 630, and a user interface (UI) 640 are operatively connected to the system bus 601. A disk storage device 631 is operatively coupled to the disk I/O adapter 630. A keyboard 641, a mouse 642, and a display 643 are operatively coupled to the UI 640. The system 100 of the invention, implemented as a computer program, is stored in the disk storage device 631. The workstation 600 is arranged to load the program and input data into memory 620 and execute the program on the processor 610. The user can input information to the workstation 600, using the keyboard 641 and/or the mouse 642. The workstation is arranged to output information to the display device 643 and/or to the disk 631. A person skilled in the art will understand that there are numerous other embodiments of the workstation 600 known in the art and that the present embodiment serves the purpose of illustrating the invention and must not be interpreted as limiting the invention to this particular embodiment.

It should be noted that the above-mentioned embodiments illustrate rather than limit the invention and that those skilled in the art will be able to design alternative embodiments without departing from the scope of the appended claims. In the claims, any reference signs placed between parentheses shall not be construed as limiting the claim. The word "comprising" does not exclude the presence of elements or steps not listed in a claim or in the description. The word "a" or "an" preceding an element does not exclude the presence of a plurality of such elements. The invention can be implemented by means of hardware comprising several distinct elements and by means of a programmed computer. In the system claims enumerating several units, several of these units can be embodied by one and the same record of hardware or software. The usage of the words first, second, third, etc., does not indicate any ordering. These words are to be interpreted as names.

The invention claimed is:

1. A system for validating motion estimation comprising:
a field unit that obtains a deformation vector field that estimates motion between a first image and a second image by transforming the first image into the second image;
a metric unit, executed by a hardware processor, that computes a vector-field-based metric of a local volume change between the first image and the second image at a plurality of locations, based on the deformation vector field; and a conformity unit, executed by the hardware processor, that computes a conformity measure, based on the computed vector-field-based metric; wherein the conformity unit:
i) computes the conformity measure further based on an image-intensity-based metric of the local volume change at the plurality of locations, the image-intensity-based metric being computed based on the first and the second image by the metric unit, or
ii) determines a neighborhood at each one of the plurality of locations, and computes the conformity measure at each one of the plurality of locations, based on a correlation coefficient computed by fitting a hyperbolic function to a joint distribution of corresponding values of the vector-field-based metric and intensities of the first image within the determined neighborhood at each position.

2. The system as claimed in claim 1, wherein the vector-field-based metric is based on the Jacobian matrix.

3. The system as claimed in claim 1, wherein the conformity measure is computed at the plurality of locations, based on the computed metric of the local volume change at the plurality of locations and the local property of the first or second image defined at the plurality of locations, thereby becoming a conformity map.

4. The system as claimed in claim 3, further comprising a peak unit that detects peaks in the conformity map.

5. The system as claimed in claim 4, further comprising a display that displays the detected peaks in the conformity map overlaid onto the first or second image.

6. The system as claimed in claim 1, wherein the field unit that computes the deformation vector field, using elastic registration of the first image with the second image.

7. The system as claimed in claim 1, further comprising an update unit that updates the deformation vector field, based on the computed conformity measure.

8. A workstation comprising the system as claimed in claim 1.

9. An image acquisition apparatus comprising the system as claimed in claim 1.

10. A method of validating motion estimation comprising:
a field step, executed by a hardware processor, for obtaining a deformation vector field estimating the motion between a first image and a second image by transforming the first image into the second image;
a metric step, executed by the hardware processor, for computing a vector-field-based metric of a local volume change between the first image and the second image at a plurality of locations, based on the deformation vector field; and
a conformity step, executed by the hardware processor, for computing a conformity measure, based on the computed vector-field-based metric; wherein the conformity step further comprises:
i) computing the conformity measure further based on an image-intensity-based metric of the local volume change at the plurality of locations, the image-intensity-based metric being computed based on the first and the second image in the metric step, or
ii) determining a neighborhood at each one of the plurality of locations, and computing the conformity measure at each one of the plurality of locations, based on a correlation coefficient computed by fitting a hyperbolic function to a joint distribution of corresponding values of the vector-field-based metric and intensities of the first image within the determined neighborhood at each position.

11. A non-transitory computer readable storage medium containing instructions, which, when executed by the hardware processor cause the hardware processor to perform the method of claim 10.

12. The system as claimed in claim 2, wherein the conformity measure is based on an absolute value of the difference between the vector-field-based metric and the intensity-intensity-based metric.

* * * * *